(12) United States Patent
Yang (10) Patent No.: US 10,714,123 B2
(45) Date of Patent: Jul. 14, 2020

(54) RECORD PLAYER

(71) Applicant: Shenzhen 1Byone Technology Co., Ltd., Shenzhen, Guangdong (CN)

(72) Inventor: Ruishi Yang, Guangdong (CN)

(73) Assignee: SHENZHEN 1BYONE TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/124,854

(22) Filed: Sep. 7, 2018

(65) Prior Publication Data

US 2019/0362742 A1    Nov. 28, 2019

(30) Foreign Application Priority Data

May 28, 2018  (CN) .......................... 2018 1 0523498
May 28, 2018  (CN) ..................... 2018 2 0808491 U (51) Int. Cl.

| | |
|---|---|
| *G11B 33/08* | (2006.01) |
| *G11B 3/00* | (2006.01) |
| *G11B 3/54* | (2006.01) |
| *G11B 33/12* | (2006.01) |
| *G11B 19/16* | (2006.01) |
| *G11B 33/02* | (2006.01) |

(52) U.S. Cl.
CPC ................ *G11B 3/007* (2013.01); *G11B 3/00* (2013.01); *G11B 3/54* (2013.01); *G11B 19/16* (2013.01); *G11B 33/025* (2013.01); *G11B 33/08* (2013.01); *G11B 33/122* (2013.01)

(58) Field of Classification Search
None
See application file for complete search history.

(56) References Cited

U.S. PATENT DOCUMENTS

| | | | | |
|---|---|---|---|---|
| 2,557,244 | A * | 6/1951 | Zelov ....................... | H04B 1/08 312/7.1 |
| 2,565,304 | A * | 8/1951 | McFarlane ............. | G03B 31/00 312/7.1 |
| 2,923,370 | A * | 2/1960 | De Capite ................ | H04R 5/02 181/145 |
| 3,272,513 | A * | 9/1966 | Jeles ........................ | G11B 3/36 369/213 |
| 3,291,487 | A * | 12/1966 | Boldt ..................... | G11B 33/02 369/75.11 |
| 3,300,222 | A * | 1/1967 | Scott ..................... | G11B 33/02 369/263.1 |

(Continued)

*Primary Examiner* — William J Klimowicz
(74) *Attorney, Agent, or Firm* — Muncy, Geissler, Olds & Lowe, P.C.

(57) ABSTRACT

The present invention relates to a record player with a cabinet, a speaker, a movement base-plate, and a movement, wherein the cabinet contains a first opening and a second opening, the first opening being positioned on a side surface, a bottom surface or a top surface of the cabinet, and the second opening being positioned on the top surface of the cabinet; the speaker is positioned at the first opening and is electrically connected to the movement; and the movement base-plate is positioned at the second opening and includes a recessed part in which the movement is placed. The record player of the present invention includes a built-in speaker and a good resonance chamber formed therein, therefore the sound quality played by the record player can be effectively improved.

8 Claims, 3 Drawing Sheets

(56) References Cited

U.S. PATENT DOCUMENTS 3,323,803 A * 6/1967 Guglielmelli .......... G11B 17/16
369/75.11
3,627,392 A * 12/1971 Ruppersburg ....... G11B 33/025
312/8.4

* cited by examiner

RECORD PLAYER

TECHNICAL FIELD

The present invention relates to the field of audio-video devices, and in particular to record players.

BACKGROUND ART

The operation of the existing movement of a record player in prior art is of a record rotated by a turntable and as a record rotates, a stylus positioned at an end of a tone arm rubs the sides of grooves on the record so as to read a sound recorded on the record. In order to make it easier for users to use a record player to listen to the record without headphones, some record players in prior art have external speakers. However, such record players have a poor resonance chamber therein, so that the sound played by the record player cannot achieve better sound quality and often are accompanied by various noises at the same time. When a turntable drives a record to rotate, warpage of the record and friction with the stylus can cause vibration and displacement of the movement in the record player, and accordingly quality of the sound generated by the record player will be unstable. In addition, the warpage of the record may also increase the degree of wear when the stylus rubs against the sides of the grooves on the record, thus resulting in poor sound quality of the record player.

SUMMARY OF THE INVENTION

In order to overcome at least one of the above drawbacks of the prior art, the present invention provides a record player with a built-in speaker and a good resonance chamber, including a cabinet, a speaker, a movement base-plate, and a movement, wherein the cabinet contains a first opening and a second opening, the first opening being positioned on a side, bottom, or top surface of the cabinet, and the second opening being positioned on the top surface of the cabinet; the internal speaker is positioned at the first opening and is electrically connected to the movement; and the movement base-plate is positioned at the second opening and includes a recessed part in which the movement is placed.

The speaker is electrically connected to the movement, and after the record is read by the movement, the sound produced by the record will be magnified by the speaker, and thus a user can hear the sound without connecting the record player to an external speaker or a pair of headphones.

Since the lower surface of the movement is uneven, the movement base-plate is positioned at the second opening in the cabinet and the movement is placed in the recessed part of the movement base-plate, thus fixing the movement and forming a resonance chamber with a smooth inner wall defined by a relatively smooth lower surface of the movement base-plate and the inner wall of the cabinet. Sound waves are regularly propagated and reflected in the smooth inner wall of the resonance chamber so as to generate regular frequency sound waves with less noise. Moreover, the frequency of the generated sound waves tends to be consistent to generate resonance in the resonance chamber, so that the user can hear a round, textured and penetrating sound.

Preferably, the cabinet is formed of wood. In order to fully reflect the sound waves in the resonance chamber, the resonance chamber is preferably formed of hard elastic material, particularly wood, as wood is relatively common in use.

Preferably, a speaker control panel is also positioned at the second opening including a volume adjustment knob for controlling the volume of the sound from the speaker, a track selection button for selecting a current track, a pause button for pausing the playing of a current record and a play button for playing the record, or the like.

Preferably, the cabinet further includes a third opening for installing an interface electrically connected with the movement for connecting to other audio devices, so that after the movement reads the sound recorded on the record, the sound can be amplified by other audio devices in addition to the internal speaker.

Further, a separator is provided in the cabinet and is parallel to the plane in which the first opening is located, so that the interior of the cabinet is divided into two chambers by the separator.

Since the surface of the speaker positioned at the first opening is also uneven, the separator arranged to be parallel to the plane in which the first opening is located divides the interior of the cabinet into two chambers. One chamber has inner walls that are not smooth and is defined by the surface of the speaker, the inner wall of the cabinet, the separator, and the movement base-plate; the other chamber has relatively smooth inner walls defined by the inner wall of the cabinet, the separator and the movement base-plate, so that this chamber can be used as the resonance chamber to further reduce generation of noise and improve quality of the sound played by the record player.

Further, the movement includes a turntable base, a tone arm base, a turntable, a tone arm, and a driving device. The tone arm is electrically connected to the speaker, and the driving device is used to drive rotation of the turntable.

The turntable is mounted on the turntable base, and the tone arm is mounted on the tone arm base; the height of the turntable base is lower than that of the tone arm base, so that the turntable base is connected to the tone arm base in a stepped form.

When the user listens to the record using the record player, the record is placed on the turntable, and the driving device drives rotation of the turntable. The tone arm reads the sound recorded on the record as the turntable rotates, and the sound is amplified by the speaker in electrical connection with the tone arm, so that the user can hear the sound.

Due to the height difference between the turntable base and the tone arm base, the turntable base is in stepped connection with the tone arm base. The stepped connection between the turntable base and the tone arm base can avoid influencing the installation of the turntable onto the turntable base, and also allows for a more reasonable position layout of the turntable base, the tone arm base, and the recessed part.

Further, the lower surface of the protruding edge located on the turntable base is abutted on the edge of the recessed part, a lower surface of the partial edge of the tone arm base is abutted on the edge of the recessed part, and the bottom of the recessed part is lower than the turntable base.

The turntable base installed with the turntable and the tone arm base installed with the tone arm are not directly placed in the recessed part and abutted on the bottom of the recessed part, but suspended in the recessed part. The lower surface of the protruding edge located on the turntable base is abutted on the edge of the recessed part and the lower surface of the partial edge of the tone arm base is abutted on the edge of the recessed part, so that the turntable base and the tone arm base can be suspended in the recessed part.

The turntable base and the tone arm base are suspended in the recessed part to form a suspension structure system.

When the turntable rotates, the formed suspension structure system can adapt to the shaking caused by the rotation of the turntable, so that the turntable base and the tone arm base can be in a stable state, facilitating sound with stable sound quality when the tone arm reads the record on the turntable.

Further, the sidewall of the recessed part includes a step portion at a position where the edge of the recessed part is abutted on the lower surface of the protruding edge. An upper surface of the step portion contains a first pin hole, and the lower surface of the protruding edge contains a first pin shaft that works in conjunction with the first pin hole.

The sidewall of the recessed part contains a second pin hole at a position where the edge of the recessed part is abutted on the lower surface of the partial edge of the tone arm base, and the lower surface of the tone arm base contains a second pin shaft that works in conjunction with the second pin hole.

The first pin shaft located on the lower surface of the protruding edge is inserted into the first pin hole located on the upper surface of the step portion, and the second pin shaft located on the lower surface of the tone arm base is inserted into the second pin hole located in the inner wall of the recessed part, which can limit displacement of the turntable base and the tone arm base in a plane perpendicular to an axis of the shaft. When the turntable rotates, the turntable base and the tone arm base are in a fixed state, so that the tone arm can read the record on the turntable continuously and normally.

Preferably, the first pin hole and/or the second pin hole contains an elastic member therein.

Due to the warpage of the record and under the action of the tone arm, the turntable may sway when it rotates, and the elastic member has the function of cushioning and damping, thus improving stability of the sound quality of the record player.

Further, the driving device includes a motor, a motor shaft, a drum, and a belt. The motor and the drum are connected by the motor shaft, the belt drives between the drum and the turntable, and the recessed part is provided with a hollow portion at a position corresponding to the motor.

The motor drives the motor shaft which rotates the drum, and the belt drives between the drum and the turntable, thus driving the rotation of the turntable. The drum is configured to ensure a certain tension in the middle part of the belt so that the belt will not fall off or slip during the rotation of the turntable, and also allows a small tension on the belt edge, thus avoiding tearing of the belt edge to reduce a service life of the belt.

The hollow portion is configured to facilitate timely heat dissipation of the motor during operation, so that the operation ambient temperature of the motor is improved and a service life of the motor is prolonged.

Further, the movement includes a speed shift switch and a speed fine-tuning knob. The speed shift switch and the speed fine-tuning knob are located on the cabinet and the movement respectively, and the speed shift switch and/or the speed fine-tuning knob are both electrically connected to the motor.

The vinyl record is usually rotated at three standard rotational speeds: 33 rpm, 45 rpm, and 78 rpm. The faster the rotational speed, the more audio can be reproduced in one minute, and the sound is more detailed and dynamic, which also means that playing of the record can be finished faster and the record capacity can be smaller. In order to make the record player adapt to the three standard rotational speeds of the vinyl records, a speed shift switch is located on the tone arm base, including at least three speed shifts corresponding to the standard rotational speeds. When listening to vinyl records of different rotational speeds, the user can control the speed shift switch to adjust the rotational speed of the turntable.

When the user finds that the rotational speed of the turntable does not meet the requirement of the vinyl being played and that sound quality is affected, the rotational speed of the turntable can be adjusted by controlling the speed fine-tuning knob located on the tone arm base to achieve the best sound quality.

Further, the movement includes a recording device and a recording transfer switch that are electrically connected to each other.

The recording device is electrically connected to the motor; when the recording transfer switch is turned on, the recording device records a sound if the motor is in operation, and the recording device plays the recorded sound if the motor stops.

The user can turn on the recording transfer switch if the user wants the record to be played or wants the record player's sound continuously playing when the record is accidentally interrupted during playing. When the recording transfer switch is turned on, the recording transfer switch records the sound if the vinyl record rotates along with the turntable and plays the recorded sound back if the turntable stops rotating.

Further, the tone arm includes a pickup arm, a plurality of styluses, and a stylus switching device for switching the styluses. The tone arm base is movably connected to a first end of the pickup arm, and the stylus and the stylus switching device are located on a second end of the pickup arm.

The tone arm base is movably connected to the first end of the pickup arm, so that the stylus located on the second end of the pickup arm can contact or leave the record on the turntable.

A general stylus tip includes a round tip, an elliptical tip, and an ultra-elliptical tip. Grooves of the vinyl record are of a V shape with an angle of 90°. The round tip cannot access or come into contact with the bottom of the groove, but it is easy to adjust the relative position between the tip and the record, making the round tip more suitable for many users. The ellipse tip is similar to the shape of the groove and can access lower and smaller parts of the groove, so that the sound details picked up are much richer than the round tip, and its effect on play is better than the round tip. The ultra-elliptical tip has a thinner edge which allows better access to high-frequency grooves, but the elliptical tip and the ultra-elliptical tip are very thin, meaning they are prone to problems such as noise, wear, and positioning. In addition, compact records, single-sided records, and double-sided records have different requirements for the stylus. The plurality of styluses and the stylus switching device are positioned on the second end of the tone arm, so that the record player can flexibly adapt to the needs of different users and different records.

Further, the tone arm contains a magnifying glass for observing a tip of the stylus.

The magnifying glass located on the tone arm facilitates observation of the wear state of the stylus. When the user views the stylus through the magnifying glass and finds the tip of the stylus seriously worn, the stylus will need to be replaced to avoid further decreases in sound quality of the record player due to the serious wear of the stylus.

Compared with the prior art, the present invention has the following desired effects.

(1) The speaker and movement of the record player are integrated into the cabinet and the movement base-plate, so that the user can listen to the record without an external speaker or headphones. Further, the movement base-plate contains a recessed part in which the movement is placed; and a separator is located in the cabinet, so that a resonance chamber with relatively smooth inner walls is formed by the inner walls of the movement base-plate, the separator, and the cabinet, and thus the sound played by the record player is round, textured, and penetrating, with less noise.

(2) The movement is suspended in the recessed part forming a suspension structure system, so that the movement is in a stable state when the turntable rotates, which is advantageous for the tone aim to obtain sound with stable sound quality when reading the record on the turntable.

(3) The movement base-plate and the movement are connected through pin and shaft, which can restrict the displacement of the movement and play the role of cushioning and damping when the tone arm reads the record on the turntable.

(4) The record player can adapt to different rotational speeds of the vinyl records by a speed shift switch and a speed fine-tuning knob, and can adapt to different vinyl records by a plurality of styluses and a stylus switching device. Further, a wear state of the stylus can be observed by a magnifying glass so as to replace the worn stylus in time.

DESCRIPTION OF EMBODIMENTS

The drawings are for the purposes of illustration only and are not intended to limit the present invention.

Some components in the drawings are omitted, enlarged or reduced for better description of the embodiments, and sizes of these components do not represent actual sizes thereof.

For those skilled in the art, it will be understood that some known structures in the drawings and descriptions thereof are omitted.

As used in the description of the present invention, it is to understand that the terms "first" and "second" are for the purpose of description only and are not intended to indicate or imply a relative importance or implied number of technical features indicated. Thus, the defined "first" and "second" features may include one or more of the features, either explicitly or implicitly. In the description of the present invention, the term "a plurality of" means two or more unless otherwise stated.

In the description of the present invention, it should be noted that, unless indicated or defined otherwise, the terms "installed to" or "coupled to" should be understood broadly, for example, they may refer to a fixed connection, detachable connection, or integral connection; they may also refer to mechanical connection or electrical connection, a direct connection or indirect connection through an intermediate medium, and an internal connection of two components. Those skilled in art should appreciate the specific meanings of the above terms in the present invention in specific cases.

The technical solution of the present invention will be further described below with reference to the drawings and embodiments.

Figure 1:
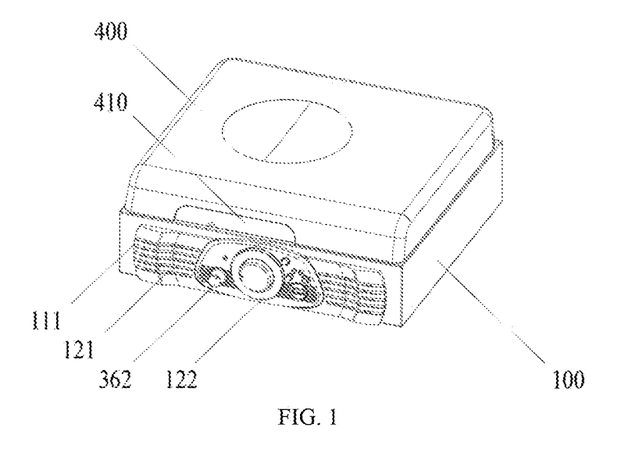
FIG. 1 is a schematic structural view of an embodiment of the present invention.
Figure 2:
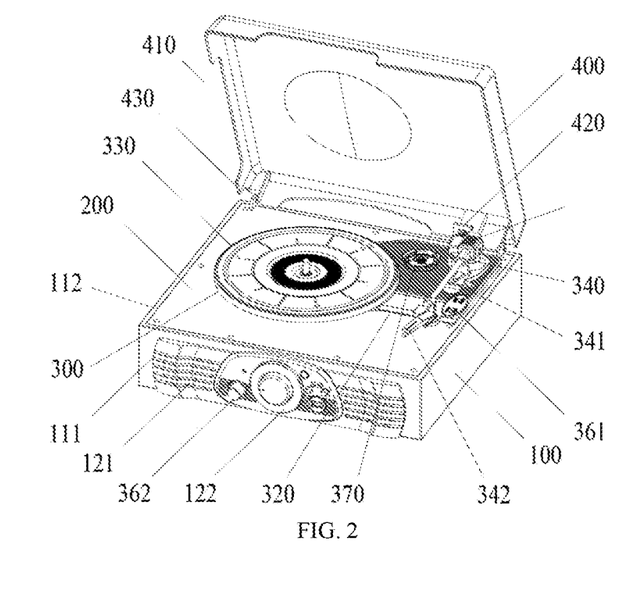
FIG. 2 is another schematic structural view of the embodiment of the present invention.
Figure 3:
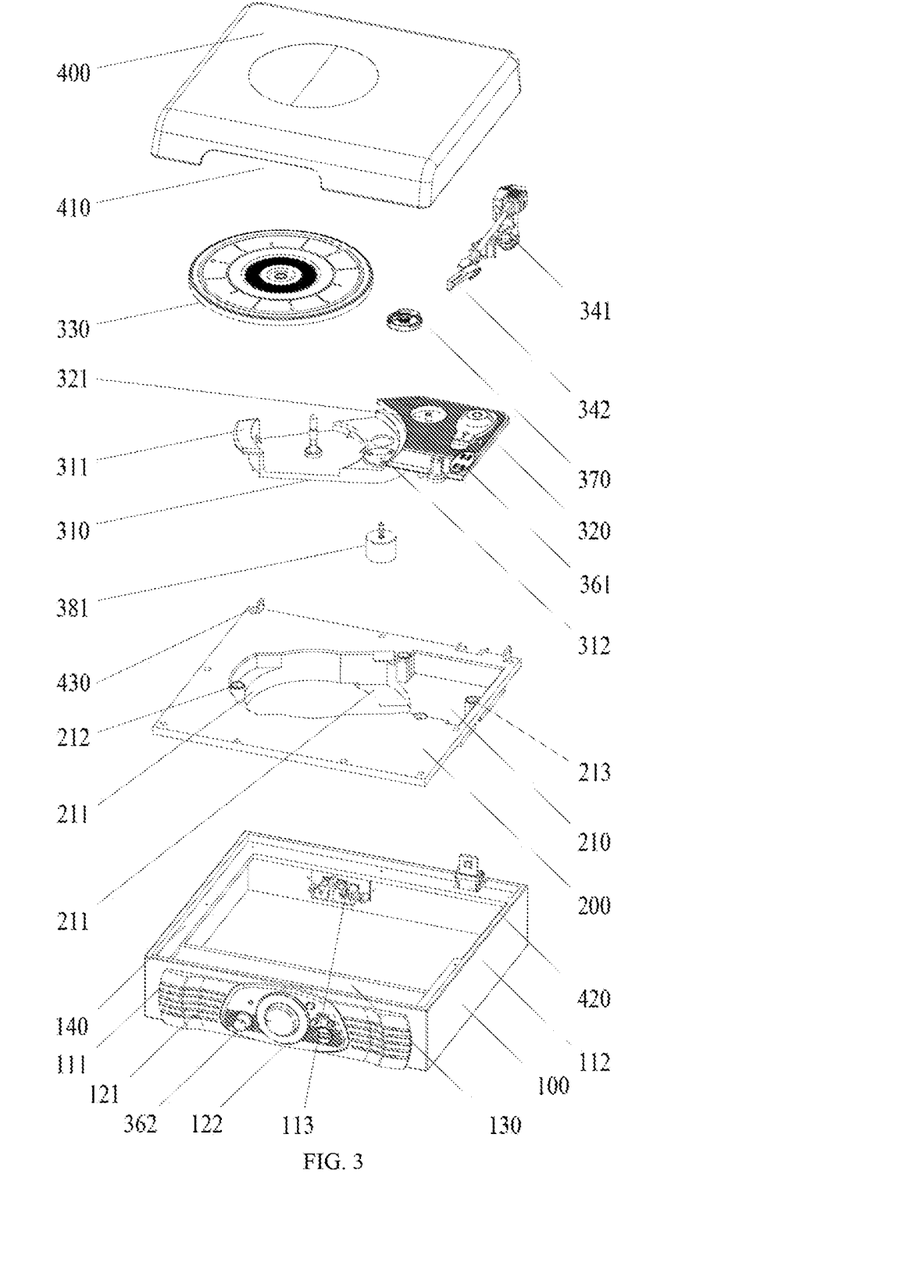
FIG. 3 is an exploded view of an embodiment of the present invention.

FIG. 1 to FIG. 3 show a record player including a cabinet 100, a speaker 121, a movement base-plate 200, and a movement 300. The cabinet 100 contains a first opening 111 and a second opening 112, with the first opening 111 located on a side surface, a bottom surface or a top surface of the cabinet 100, and the second opening 112 located on the top surface of the cabinet 100. The speaker 121 is positioned at the first opening 111 and is electrically connected to the movement 300. The movement base-plate 200 is positioned at the second opening 112 and is provided with a recessed part 210 matched with the movement 300 so as to place the movement 300 therein.

The speaker 121 is electrically connected to the movement 300, and after being read by the movement 300, the sound recorded on the record is then magnified by the speaker 121, so that a user can hear the sound without connecting the record player to an external speaker or pair of headphones.

Since the lower surface of the movement 300 is uneven, the movement base-plate 200 is positioned at the second opening 112 of the cabinet 100 and the movement 300 is placed in the recessed part 210 of the movement base-plate 200, thus fixing the movement 300 and forming a resonance chamber with a smooth inner wall defined by a relatively smooth lower surface of the movement base-plate 200 and the inner wall of the cabinet 100. Sound waves are regularly propagated and reflected in the smooth inner wall of the resonance chamber so as to generate regular frequency sound waves with less noise. Moreover, the frequency of the generated sound waves tends to be consistent to generate resonance in the resonance chamber, so that the user can hear a round, textured and penetrating sound.

Preferably, the cabinet 100 is formed of wood. In order to fully reflect the sound waves in the resonance chamber, the resonance chamber is preferably formed of hard elastic material, particularly wood, as wood is relatively common in use.

Preferably, a speaker control panel 122 is also positioned at the second opening 112, including a volume adjustment knob, a track selection button, a pause button, a play button, or the like.

The user can control the volume of the sound from the speaker 121 using the volume adjustment knob, select a current track using the track selection button, pause the playing of a current record using the pause button, and play the record using the play button.

In the specific implementation of the embodiment, there are two first openings 111, and two speakers 121 are positioned in each of the two first openings 111. The speaker control panel 122 is positioned between the two speakers 121.

In the specific implementation of the embodiment, the edges of the second opening 112 contain support straps 140 and bolts for supporting and connecting the movement base-plate 200 so as to fix the movement base-plate 200 to the second opening 112 of the cabinet 100.

Preferably, the cabinet 100 further has a third opening 113 for installing an interface electrically connected with the movement 300 for connecting to other audio devices, so that after the movement 300 reads the sound recorded in the record, the sound can be amplified by other audio devices in addition to the speaker 121.

In the embodiment, a separator 130 is positioned in the cabinet 100 and is parallel to the plane in which the first opening 111 is located, so that the interior of the cabinet 100 is divided into two chambers by the separator 130.

Since the surface of the speaker 112 at the first opening 111 is also uneven, the separator 130 is arranged to be parallel to the plane in which the first opening 111 is located and divides the interior of the cabinet 100 into two chambers; one chamber with inner walls that are not smooth and is defined by the surface of the speaker 121, the inner wall of the cabinet 100, the separator 130, and the movement base-plate 200 and the other chamber with relatively smooth inner walls and is defined by the inner wall of the cabinet 100, the separator 130 and the movement base-plate 200, so that this chamber can be used as the resonance chamber to further reduce generation of noise and improve quality of the sound played by the record player.

In the embodiment, the movement 300 includes a turntable base 310, a tone arm base 320, a turntable 330, a tone arm 340, and a driving device. The tone arm 340 is electrically connected to the speaker 121, and the driving device is used to drive rotation of the turntable 330.

The turntable 330 is mounted on the turntable base 310, and the tone arm 340 is mounted on the tone arm base 320. The height of the turntable base 310 is lower than that of the tone arm base 320, so that the turntable base 310 is connected to the tone arm base 320 in a stepped form.

When the user listens to the record using the record player, the record is placed on the turntable 330, and the driving device drives rotation of the turntable 330. The tone arm 340 reads the sound recorded on the record as the turntable 330 rotates, and the sound is amplified by the speaker 121 or other audio devices in electrical connection with the tone arm 340, so that the user can hear the sound.

Due to the height difference between the turntable base 310 and the tone arm base 320, the turntable base 310 is in stepped connection with the tone arm base 320. The stepped connection between the turntable base 310 and the tone arm base 320 can avoid influencing the installation of the turntable onto the turntable base 310, and also allows a more reasonable position layout of the turntable base 310, the tone arm base 320, and the recessed part 210.

In the embodiment, the turntable base 310 contains a protruding edge 311, and the lower surface of the protruding edge 311 is abutted on an edge of the recessed part 210. A lower surface of the partial edge of the tone arm base 320 is abutted on the edge of the recessed part 210.

The turntable base 310 installed with the turntable 330 and the tone arm base 320 installed with the tone arm 340 are not directly placed in the recessed part 210 or abutted on the bottom of the recessed part 210, but rather suspended in the recessed part 210. The lower surface of the protruding edge 311 located on the turntable base 310 is abutted on the edge of the recessed part 210 and the lower surface of the partial edge of the tone arm base 320 is abutted on the edge of the recessed part 210, so that the turntable base 310 and the tone arm base 320 can be suspended in the recessed part 210.

The turntable base 310 and the tone atm base 320 are suspended in the recessed part 210 to form a suspension structure system. When the turntable 330 rotates, the formed suspension structure system can adapt to the shaking caused by the rotation of the turntable 330, so that the turntable base 310 and the tone arm base 320 can maintain a stable state, facilitating sound with stable sound quality when the tone aim 340 reads the record on the turntable 330.

Figure 4:
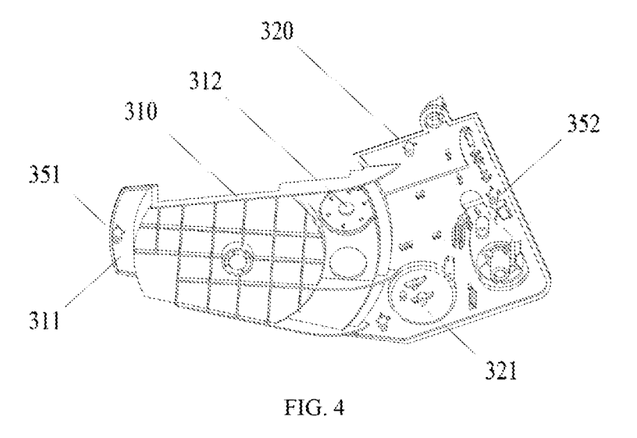
FIG. 4 is a schematic structural view of a movement base-plate according to an embodiment of the present invention.

As shown in FIG. 3 and FIG. 4, in the embodiment, the sidewall of the recessed part 210 contains a step portion 211 at a position where the edge of the recessed part 210 is abutted on the lower surface of the protruding edge 311. An upper surface of the step portion 211 contains a first pin hole 212, and the lower surface of the protruding edge 311 contains a first pin shaft 351 matched with the first pin hole 212.

The sidewall of the recessed part 210 contains a second pin hole 213 at a position where the edge of the recessed part 210 is abutted on the lower surface of the partial edge of the tone arm base 320. The lower surface of the tone arm base 320 contains a second pin shaft 352 matched with the second pin hole 213.

The first pin shaft 351 positioned on the lower surface of the protruding edge 311 is inserted into the first pin hole 212 positioned on the upper surface of the step portion 211, and the second pin shaft 352 positioned on the lower surface of the tone arm base 320 is inserted into the second pin hole 213 positioned in the inner wall of the recessed part 210, which can limit displacement of the turntable base 310 and the tone arm base 320 in a plane perpendicular to the pin shaft. When the turntable 330 rotates, the turntable base 310 and the tone arm base 320 can keep in fixed state, so that the tone arm 340 can read the record on the turntable 330 continuously and normally.

In the specific implementation of the embodiment, the sidewall of the recessed part 210 contains a plurality of second pin holes 213 at a position where the edge of the recessed part 210 is abutted on the lower surface of the partial edge of the tone arm base 320. The lower surface of the tone arm base 320 contains a plurality of second pin shafts 352 that work in conjunction with the second pin holes 213. The plurality of second pin holes 213 and second pin shafts 352 can enhance the displacement limit to the tone aim base 320.

Preferably, the first pin hole 212 and/or the second pin hole 213 contains an elastic member therein.

Due to the warpage of the record and the action of the tone arm 340, the turntable 330 may sway when rotating, and the elastic member has the function of cushioning and damping, thus improving the stability of sound quality of the record player.

Figure 5:
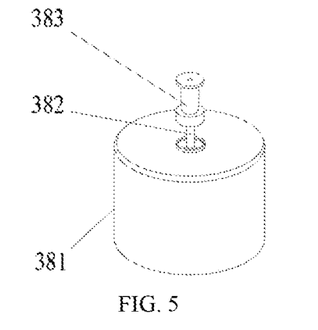
FIG. 5 is an enlarged view of a motor according to an embodiment of the present invention.

As shown in FIG. 3 and FIG. 5, the driving device in the embodiment includes a motor 381, a motor shaft 382, a drum 383, and a belt. The motor 381 and the drum 383 are connected by the motor shaft 382, the belt drives between the drum 383 and the turntable 330, and the recessed part 210 contains a hollow portion at a position corresponding to the motor 381.

The motor 381 drives the motor shaft 382 which rotates the drum 383, and the belt drives between the drum 383 and the turntable 330, thus driving the rotation of the turntable 330. The drum 383 is configured to ensure a certain tension in the middle part of the belt so that the belt will not fall off or slip during the rotation of the turntable 330, and also allows a small tension on the belt edge, thus avoiding tearing of the belt edge to reduce a service life of the belt.

The hollow portion is configured to facilitate timely heat dissipation of the motor 381 during operation, so that the operation ambient temperature of the motor 381 is improved and the service life of the motor 381 is prolonged.

In the specific implementation of the embodiment, the motor 381 is positioned below the turntable base 310 and the drum 383 is positioned above the turntable base 310. The turntable base 310 contains a through hole 312, through which the motor shaft 382 can pass to connect the motor 381 and the drum 383.

In the embodiment, the movement 300 further includes a speed shift switch 361 and a speed fine-tuning knob 362. The speed shift switch 361 is located on the tone arm base 320, the speed fine-tuning knob 362 is located on the speaker control panel 122, and the speed shift switch 361 and the speed fine-tuning knob 362 are both electrically connected to the motor 381.

The vinyl record is usually rotated at three standard rotational speeds: 33 rpm, 45 rpm, and 78 rpm. The faster the rotational speed, the more audio can be reproduced in one minute, and the sound is more detailed and dynamic, which also means that playing of the record can be finished faster. In order to make the record player adapt to the three standard rotational speeds of vinyl records, a speed shift switch 361 is located on the tone arm base 320, including at least three speed shifts corresponding to the standard rotational speeds. When listening to vinyl records of different rotational speeds, the user can control the speed shift switch 361 to adjust the rotational speed of the turntable 330.

When the user finds the rotational speed of the turntable 330 does not meet the requirement of the vinyl record being played and that sound quality is affected, the rotational speed of the turntable 330 can be adjusted by controlling the speed fine-tuning knob 362 located on the tone arm base 320 to achieve the best sound quality.

In the embodiment, the movement 300 further includes a recording device and a recording transfer switch that are electrically connected to each other.

The recording device is electrically connected to the motor 381; when the recording transfer switch is turned on, the recording device records a sound if the motor 381 is in operation, and the recording device plays the recorded sound if the motor 381 stops.

The user can turn on the recording transfer switch if the user wants the record to be played or wants that the record player's sound is not interrupted when the record is accidentally interrupted during playing. When the recording transfer switch is turned on, the recording device records the sound if the vinyl record rotates along with the turntable 330 and plays the recorded sound back if the turntable 330 stops rotating.

In the embodiment, the tone arm 340 includes a pickup arm 341, a plurality of styluses 342, and a stylus switching device for switching the styluses 342. The tone arm base 320 is movably connected to a first end of the pickup arm 341, and the stylus 342 and the stylus switching device are located on a second end of the pickup arm 341.

The tone arm base 320 is movably connected to the first end of the pickup arm 341, so that the stylus 342 located on the second end of the pickup arm 341 can contact or leave the record on the turntable 330.

In the specific implementation of the embodiment, the first end of the pickup arm 341 ends near the speaker, and the second end of the pickup arm 341 ends away from the speaker.

General stylus tips include a round tip, an elliptical tip, and an ultra-elliptical tip. Grooves of the vinyl record are of a V shape with an angle of 90°. The round tip cannot access or come into contact with the bottom of the groove, but it is easy to adjust the relative position between the tip and the record, making the round tip more suitable for many users. The ellipse tip is similar to the shape of the groove and can access lower and smaller parts of the groove, so that the sound details picked up are much richer than the round tip, and its effect on play is better than the round tip. The ultra-elliptical tip has a thinner edge which allows better access to high-frequency grooves, but the elliptical tip and the ultra-elliptical tip are very thin, meaning they are prone to problems such as noise, wear, and positioning. In addition, compact records, single-sided records, and double-sided records have different requirements for the stylus 342. The plurality of styluses 342 and the stylus switching device are positioned on the second end of the tone arm 340, so that the record player can flexibly adapt to the needs of different users and different records.

In the embodiment, the tone arm 340 further contains a magnifying glass for viewing tip of the stylus 342.

In the specific implementation of the embodiment, the magnifying glass is located on the second end of the pickup arm 341.

The magnifying glass located on the tone arm 340 facilitates observation of the wear state of the stylus 342. When the user views the stylus through the magnifying glass and finds the tip of the stylus 342 seriously worn, the stylus 342 will need to be replaced to avoid further decreases in sound quality of the record player due to the serious wear of the stylus 342.

Preferably, the magnifying glass is telescopic. When there is need to observe the wear state of the stylus 342, the user can pull the magnifying glass out; when there is no need to observe the wear state of the stylus 342, the user can fold the magnifying glass up to avoid the magnifying glass influencing the stylus 342 when the stylus is reading the sound recorded on the record.

As shown in FIG. 1 to FIG. 3, preferably, the record player further includes a top cover 400 to keep away dust and protect the movement 300 from damage.

The top cover 400 and the cabinet 100 are movably connected by a hinge 420. The top cover 400 and the movement base-plate 200 are movably connected by a connecting member 430.

The top cover 400 contains hollow portions 410 in rounded rectangle shape. The user can put the hands into the top cover hollow portions 410 so as to hold the top cover 400 for opening and closing of the top cover 400.

Preferably, the record player further includes an inner hole holder 370, and the tone arm base 320 further includes a containing groove 321 for containing the holder 370. The inner hole diameters of different records are different. When listening to records with different inner hole diameters, the inner hole holder 370 is placed in the center of the turntable 330 to fix the record so as to prevent the record from moving around the turntable 330; and when the record is not being listened to, the inner hole holder 370 is placed in the containing groove 321, so that the inner hole holder 370 will be not easily lost.

The same or similar reference numerals correspond to the same or similar parts.

The positional relationships described in the drawings are illustrative only and are not intended to limit the present invention.

Obviously, the above embodiments of the present invention are merely examples for clear illustration and are not intended to limit the implementations of the present invention. For those skilled in the art, modifications or changes can be made on the basis of the above description. There is no need nor exhaustion for all implementations. Any modification, equivalent substitution, improvement, or the like within the spirit and principle of the present invention will fall within the scope of the claims of the present invention.

The invention claimed is:

1. A record player, comprising:
    a cabinet that includes a first opening located on a side surface, a bottom surface or a top surface of the cabinet and a second opening located on the top surface of the cabinet;
    a speaker positioned at the first opening;
    a movement base-plate positioned at the second opening and including a recessed part; and
    a movement positioned in the recessed part and electrically connected to the speaker, wherein the movement includes:
        a turntable base;
        a tone arm base, wherein the height of the turntable base is lower than that of the tone arm base, and the turntable base is connected to the tone arm base in a stepped form;
        a turntable mounted on the turntable base;
        a tone arm mounted on the tone arm base and electrically connected to the speaker; and
        a driving device used to drive the turntable to rotate,
    wherein a lower surface of a protruding edge located on the turntable base is abutted on an edge of the recessed part, a lower surface of a partial edge of the tone arm base is abutted on the edge of the recessed part, and the bottom of the recessed part is lower than the turntable base.

2. The record player according to claim 1, wherein a separator is positioned in the cabinet and is parallel to a plane in which the first opening is located, so that the interior of the cabinet is divided into two chambers by the separator.

3. The record player according to claim 1, wherein a sidewall of the recessed part contains a stepped portion at a position where the edge of the recessed part is abutted on the lower surface of the protruding edge, an upper surface of the stepped portion contains a first pin hole, and the lower surface of the protruding edge contains a first pin shaft that works in conjunction with the first pin hole, and wherein the sidewall of the recessed part contains a second pin hole at a position where the edge of the recessed part is abutted on the lower surface of the partial edge of the tone arm base, and the lower surface of the tone arm base contains a second pin shaft that works in conjunction with the second pin hole.

4. The record player according to claim 1, wherein the driving device includes
    a motor, wherein the recessed part contains a hollow portion at a position corresponding to the motor,
    a drum,
    a motor shaft through which the motor and the drum are connected, and a belt driving between the drum and the turntable.

5. The record player according to claim 4, wherein the movement further includes a speed shift switch and/or a speed fine-tuning knob, located on the cabinet and the movement respectively and are both electrically connected to the motor.

6. The record player according to claim 4, wherein the movement further includes a recording device and a recording transfer switch that are electrically connected to each other,
    wherein the recording device is electrically connected to the motor, and when the recording transfer switch is turned on, the recording device records a sound when the motor is in operation, and the recording device plays the recorded sound when the motor stops.

7. The record player according to claim 1, wherein the tone arm includes a pickup arm, a plurality of styluses, and a stylus switching device for switching the styluses, and
    wherein the tone arm base is movably connected to a first end of the pickup arm, and the stylus and the stylus switching device are located on a second end of the pickup arm.

8. The record player according to claim 7, wherein the tone arm further contains a magnifying glass for observing a tip of the stylus.

* * * * *